US008706890B2

(12) United States Patent
Chen et al.

(10) Patent No.: US 8,706,890 B2
(45) Date of Patent: *Apr. 22, 2014

(54) DEVICE PROFILE ASSIGNMENT BASED ON DEVICE CAPABILITIES

(75) Inventors: Jack Chen, Belmont, CA (US); Rupen Chanda, San Francisco, CA (US)

(73) Assignee: Adobe Systems Incorporated, San Jose, CA (US)

( * ) Notice: Subject to any disclaimer, the term of this patent is extended or adjusted under 35 U.S.C. 154(b) by 67 days.

This patent is subject to a terminal disclaimer.

(21) Appl. No.: 13/410,410

(22) Filed: Mar. 2, 2012

(65) Prior Publication Data

US 2013/0166777 A1 Jun. 27, 2013

Related U.S. Application Data

(63) Continuation of application No. 11/945,233, filed on Nov. 26, 2007, now Pat. No. 8,131,875.

(51) Int. Cl.
*G06F 15/16* (2006.01)

(52) U.S. Cl.
USPC ............................ 709/228; 709/219; 709/246

(58) Field of Classification Search
USPC .................................................. 709/223, 224
See application file for complete search history.

(56) References Cited

U.S. PATENT DOCUMENTS

| | | | |
|---|---|---|---|
| 6,430,624 B1 * | 8/2002 | Jamtgaard et al. ............ 709/246 |
| 6,589,291 B1 * | 7/2003 | Boag et al. ..................... 715/235 |
| 6,687,745 B1 * | 2/2004 | Franco et al. ................. 709/219 |
| 7,027,801 B1 * | 4/2006 | Hall et al. .................. 455/412.1 |
| 7,103,661 B2 * | 9/2006 | Klein ............................. 709/225 |
| 7,155,681 B2 * | 12/2006 | Mansour et al. .............. 715/762 |
| 7,284,046 B1 * | 10/2007 | Kreiner et al. ................ 709/223 |
| 7,340,244 B1 * | 3/2008 | Osborne et al. ............ 455/414.1 |
| 7,343,317 B2 * | 3/2008 | Jokinen et al. ............. 705/14.64 |
| 7,567,575 B2 * | 7/2009 | Chen et al. .................... 370/401 |
| 7,594,273 B2 * | 9/2009 | Keanini et al. ................... 726/25 |
| 7,603,106 B2 * | 10/2009 | Aaltonen et al. ........... 455/412.1 |
| 7,752,298 B2 * | 7/2010 | Fujii et al. ...................... 709/223 |
| 7,940,908 B2 * | 5/2011 | Sprigg et al. ............ 379/201.02 |
| 8,131,875 B1 * | 3/2012 | Chen et al. .................... 709/246 |
| 2002/0002705 A1 * | 1/2002 | Byrnes et al. ..................... 725/14 |
| 2002/0032754 A1 * | 3/2002 | Logston et al. ............... 709/219 |
| 2002/0067816 A1 * | 6/2002 | Bushnell .................. 379/201.02 |
| 2002/0069263 A1 * | 6/2002 | Sears et al. .................... 709/218 |
| 2003/0135563 A1 * | 7/2003 | Bodin et al. .................. 709/206 |

(Continued)

OTHER PUBLICATIONS

"Advisory Action", U.S. Appl. No. 11/945,233, (Jun. 11, 2010), 4 pages.

(Continued)

*Primary Examiner* — Viet Vu
*Assistant Examiner* — Timothy Sowa
(74) *Attorney, Agent, or Firm* — Wolfe-SBMC

(57) ABSTRACT

Systems and methods, including computer software implementations, involve identifying a first set of device capabilities associated with an electronic device. The first set of device capabilities include one or more device capabilities. A description of the first set of device capabilities is provided to a remote source, and a first device profile identifier is received from the remote source. The first device profile identifier is associated with the first set of device capabilities. The first device profile identifier is stored on the electronic device, and the received first device profile identifier is included in a communication to the remote source.

20 Claims, 4 Drawing Sheets

(56) References Cited

U.S. PATENT DOCUMENTS

| | | | |
|---|---|---|---|
| 2004/0024867 A1* | 2/2004 | Kjellberg | 709/224 |
| 2004/0098669 A1* | 5/2004 | Sauvage et al. | 715/513 |
| 2006/0212621 A1* | 9/2006 | Ash et al. | 710/62 |
| 2007/0130331 A1* | 6/2007 | Kao et al. | 709/224 |
| 2007/0204300 A1* | 8/2007 | Markley et al. | 725/46 |
| 2007/0204311 A1* | 8/2007 | Hasek et al. | 725/91 |
| 2007/0204314 A1* | 8/2007 | Hasek et al. | 725/100 |
| 2008/0195664 A1* | 8/2008 | Maharajh et al. | 707/104.1 |
| 2008/0201225 A1* | 8/2008 | Maharajh et al. | 705/14 |
| 2008/0201748 A1* | 8/2008 | Hasek et al. | 725/98 |
| 2008/0220759 A1* | 9/2008 | Norrman | 455/419 |
| 2008/0243998 A1* | 10/2008 | Oh et al. | 709/203 |
| 2008/0274739 A1* | 11/2008 | Wu | 455/435.1 |
| 2008/0311936 A1* | 12/2008 | Lovell, Jr. | 455/466 |
| 2009/0198653 A1* | 8/2009 | Christianson | 707/3 |
| 2009/0313645 A1* | 12/2009 | Sathish et al. | 719/328 |

OTHER PUBLICATIONS

"Final Office Action", U.S. Appl. No. 11/945,233, (Mar. 3, 2010), 16 pages.

"Non-Final Office Action", U.S. Appl. No. 11/945,233, (Aug. 21, 2009), 15 pages.

"Notice of Allowance", U.S. Appl. No. 11/945,233, (Nov. 19, 2010), 2 pages.

"Notice of Allowance", U.S. Appl. No. 11/945,233, (Nov. 29, 2011), 8 pages.

Chanda, U.S. Appl. No. 11/567,111, filed Dec. 5, 2006.

Hosmer et al., U.S. Appl. No. 10/791,299, filed Mar. 1, 2004.

Morris et al., U.S. Appl. No. 10/791,298, filed Mar. 1, 2004.

Rodgers et al., U.S. Appl. No. 10/791,311, filed Mar. 1, 2004.

Qualcomm Incorporated, "Binary Runtime Environment for Wireless", May 8, 2003, 43 pages.

World Wide Web Consortium (W3C). "Composite Capability/Preference Profiles (CC/PP): Structure and Vocabularies 2.0", W3C Working Draft, Apr. 30, 2007, 46 pages.

Wireless Application Protocol Forum, Ltd. "WAG UAProf", Wireless Application Protocol, WAP-248-UAPROF-20011020-a, Version Oct. 20, 2001, 86 pages.

\* cited by examiner

DEVICE PROFILE ASSIGNMENT BASED ON DEVICE CAPABILITIES

CROSS-REFERENCE TO RELATED APPLICATIONS

This application is a continuation of and claims priority to U.S. patent application Ser. No. 11/945,233, entitled "Device Profile Assignment Based on Device Capabilities," filed on Nov. 26, 2007 now U.S. Pat. No. 8,131,875, the disclosure of which is hereby incorporated by reference.

BACKGROUND

The present disclosure relates to determining operational capabilities of mobile devices in mobile information systems and to providing appropriately formatted content to mobile devices. In a mobile information system, subscribers register with a wireless service provider to receive various types of content from the service provider on their mobile devices. The subscriber's mobile device may include a resident interactive multimedia application environment that includes capabilities for displaying graphics, video, animation, audio, and the like. Examples of such interactive multimedia application environments are the different versions of the Adobe® Flash®-based platform. Content provided to mobile devices equipped with such application environments are sometimes delivered in executable file formats such as the precisely described SWF (small web format) binary vector graphics format. SWF provides a compact, TAG-based, easily extendible format that supports streaming, bitmap and vector graphics, and scripting.

The operational capabilities of individual subscribing devices in a mobile information system may vary. For example, devices may have varying screen sizes, color palettes, video and/or audio playback capabilities and the like. Thus, the device may be incapable of using some content available for delivery to the device.

SUMMARY

This specification describes technologies relating to determining the operational capabilities of mobile devices in mobile information systems and to providing appropriately formatted content to those mobile devices.

In general, one aspect of the subject matter described in this specification can be embodied in a method that includes identifying a first set of device capabilities associated with an electronic device. The first set of device capabilities includes one or more device capabilities. A description of the first set of device capabilities is provided to a remote source, and a first device profile identifier associated with the first set of device capabilities is received from the remote source. The first device profile identifier is stored on the electronic device, and the received first device profile identifier is included in a communication to the remote source. Other embodiments of this aspect include corresponding systems, apparatus, and computer program products.

In another general aspect, a system includes one or more servers operable to receive a description of a set of device capabilities corresponding to a configuration of an electronic device. The servers identify a device profile identifier representing a subset of a predefined set of supported device capabilities. The subset of the predefined set of supported device capabilities is associated with the set of device capabilities corresponding to the configuration of the electronic device. The servers transmit the device profile identifier to the electronic device and receive a communication from the electronic device that includes the device profile identifier. The servers select content having a format suitable for the configuration of the electronic device based on the device profile identifier and transmit the content to the electronic device.

These and other embodiments can optionally include one or more of the following features. The one or more device capabilities include a language supported by the electronic device, an application installed on the electronic device, an operating system installed on the electronic device, a hardware device installed on the electronic device, a video format supported by the electronic device, an audio format supported by the electronic device, an image format supported by the electronic device, and/or a communications protocol supported by the electronic device. The first set of device capabilities are identified by examining a configuration file associated with the electronic device. The first device profile identifier is further associated with a subset of a predefined set of device capabilities recognized by the remote source. The subset of the predefined set of device capabilities is selected from multiple predefined subsets of the predefined set of device capabilities. The subset of the predefined set of device capabilities is generated from the predefined set of device capabilities recognized by the remote source in response to the provided description of the first set of device capabilities associated with the electronic device. After receiving the first device profile identifier, a modification to the first set of device capabilities associated with the electronic device is detected and a description of the modified first set of device capabilities is provided to the remote source. The description of the modified first set of device capabilities is different from the description of the first set of device capabilities. The modification is detected by examining a configuration file associated with the electronic device. The configuration file associated with a validity code, and the validity code is compared to a reference code. A determination is made that the configuration file has been modified based, at least in part, on the comparison. A second device profile identifier is received from the remote source, and the second device profile identifier is associated with the modified first set of device capabilities. The second device profile identifier is stored on the electronic device and is included in a communication to the remote source. An error message is received from the remote source, and the error message indicates that the remote source is unable to provide an appropriate device profile identifier corresponding to the modified first set of device capabilities.

The description of device capabilities includes multiple description elements, and each description element includes a single-value description element describing a single device capability and/or a multi-value description element describing a plurality of related device capabilities. Device capabilities in the set of device capabilities described by a single-value description element are represented in the first subset of the predefined set of device capabilities recognized by the remote source. Less than all device capabilities in the set of device capabilities described by a multi-value description element are represented in the first subset of the predefined set of device capabilities recognized by the remote source. The description can include a multi-value description element describing a first audio format and a second audio format different from the first audio format, and the first subset of the predefined set of device capabilities recognized by the remote source can be a single audio format. After receiving the first device profile identifier, a request for a current set of device capabilities may be received from the remote source. A second description of a current set of device capabilities associated with the electronic device is generated, and the current set of device capabilities can represent the current configuration of the electronic device. The second description can be provided to the remote source, and a second device profile identifier can be received from the remote source in response to providing the second description. The second device profile identifier can be different from the first device profile identifier, and the second device profile identifier can represent a second subset of the predefined set of device capabilities recognized by the remote source. The second device profile identifier can be stored on the electronic device. The first device profile identifier includes a first validity code, and the second device profile identifier includes a second validity code that is different from the first validity code. The first validity code can be a first time stamp, the second validity code can be a second time stamp, and the second time stamp can be more recent that the first time stamp. Content can be received from the remote source, and the content can correspond to the current configuration represented by the set of device capabilities. The received content can include an image, and the current configuration can include a supported image format, where the image conforms to the supported image format. The image format can be a graphics interchange (.gif) format, a joint photographic experts group (.jpg) format, or a tagged image file (.tif) format. The one or more servers can be adapted to interact with the electronic device through a wireless data communication network. New content may be received from the remote source, and the new content can have a format suitable for a new configuration of the electronic device based on a new device profile identifier. The new content may be transmitted to the electronic device.

Particular embodiments of the subject matter described in this specification can be implemented to realize one or more of the following advantages. Mobile devices may be responsible for maintaining their own data regarding device capabilities, which may increase efficiency by not requiring a wireless service provider that provides content to maintain detailed information regarding device capabilities of large numbers of devices. Different devices may be categorized among a relatively limited number of device profiles that can each be associated with mobile devices having the same or merely similar capabilities. The content to be delivered to a device may be selected based on a device profile instead of based on knowledge of individual device capabilities and configurations. Content received from content providers for delivery to mobile devices can be automatically transformed by a server into formats or configurations appropriate for various devices based on device profiles and resource profiles that each define a category of resources for delivery to certain categories of mobile devices. Content may be transformed into multiple variants using a sequence of transformation filters.

The details of one or more embodiments of the invention are set forth in the accompanying drawings and the description below. Other features, aspects, and advantages of the invention will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
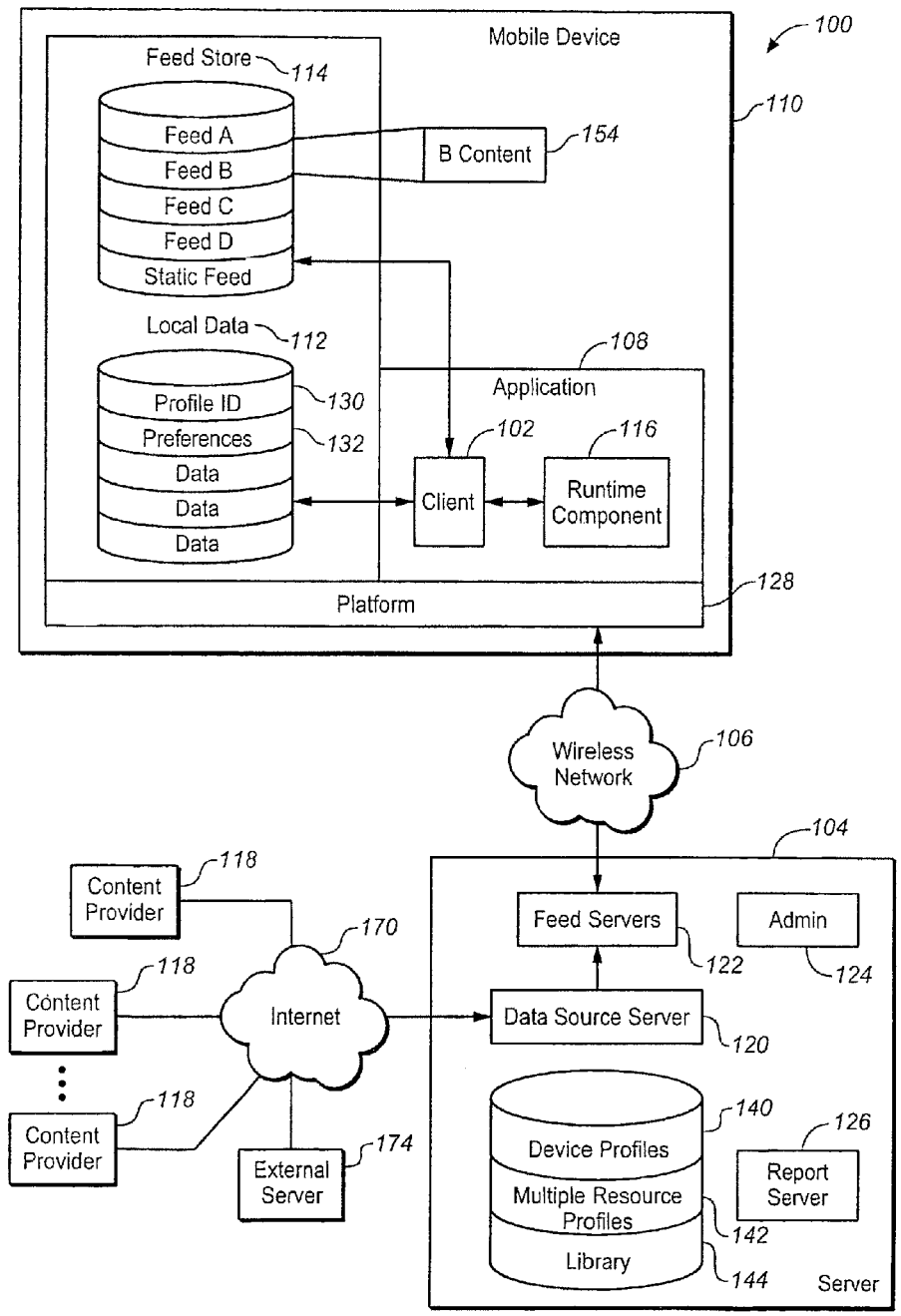
FIG. 1 illustrates an example system for providing content to mobile devices according to device capabilities.

When a computer system, such as a mobile information system, is configured to receive content from an external content provider and deliver the received content to multiple electronic devices, the computer system may include procedures designed to ensure that the received content is delivered to the electronic devices in a form appropriate for the electronic devices. In a mobile information system, subscribers may register with a wireless service provider to receive various types of content from the service provider on their mobile electronic devices. Third party content providers may also register or contract with the wireless service provider to provide various types of content to subscribers over a network, such as the Internet, via the service provider. The subscriber's mobile device may include a resident interactive multimedia application environment that includes capabilities for displaying graphics, video, animation, audio, and the like. Examples of such interactive multimedia application environments are the different versions of the Adobe® Flash®-based platform. Content provided to mobile devices equipped with such application environments are sometimes delivered in executable file formats such as the precisely described SWF binary vector graphics format. SWF provides a compact, TAG-based, easily extendible format that supports streaming, bitmap and vector graphics, and scripting. Content may include other data or files, such as a feature film, an executable software update, or a software extension.

In some implementations, wireless service providers deliver content to the mobile devices of their subscribers in the form of information channels. Each information channel may originate with the wireless service provider or may originate with third party content providers. When a subscriber subscribes to a particular information channel, the wireless service provider delivers content associated with that information channel to the subscriber's mobile device. The content may be delivered as a channel feed to a file system (i.e., a feed store) located on the mobile device. The feed store may be logically divided into separate compartments or memory allocations with each channel assigned its own compartment on a static or dynamic basis. Periodically, the wireless service provider may deliver channel content updates to the mobile device. The updates may be provided according to a predetermined schedule, in response to a request from the mobile device, in response to an availability of updates at the content provider, in response to an expiration or consumption (e.g., viewing) of content previously delivered to the mobile device or in some other way. Because the channel content is stored locally on the mobile device and frequently updated, the subscriber is usually able to access the channel without having to wait for channel content or content updates to be delivered over the network. The channel content may be automatically delivered to the mobile device in the background (i.e., without a specific user request and/or while the mobile device is otherwise idle or being used to view other channels or perform other operations.

For example, a wireless service provider may offer several different information channels to its subscribers. Some information channels may be freely available to all subscribers, while other information channels may require premium subscriber status. The content of some information channels may originate with the wireless service provider. The content of other information channels may originate with third parties that have registered with the service provider. The content of still other information channels may originate with other sources. The offered information channels may include a premium news channel. If a subscriber has subscribed to the premium news channel, then the wireless service provider may establish a channel feed to periodically or sporadically deliver content from the premium news channel to the feed store located on the subscriber's mobile device. When the subscriber accesses the premium news channel, processes on the mobile device retrieve the content from the feed store. Even if the subscriber rarely or even never accesses the premium news channel, the channel feed may provide for regular updates of channel content in the feed store based, for example, on an expiration of content and/or an availability of new content.

Channel content may be in the form of text, images, vector graphics, bitmaps, frame-based animation, video, or in any other format supported by the mobile information system, and may include executable scripts or other sequences of instructions. Depending on the format of the channel content, an application running on the mobile device, such as a media player or other type of runtime component, may be invoked to run the script, execute the instructions, or otherwise display the content. One example of such a mobile information system is described in U.S. patent application Ser. No. 10/791, 298, filed Mar. 1, 2004 and entitled "MOBILE RICH MEDIA INFORMATION SYSTEMS," the entire contents of which are hereby incorporated by reference.

Because different mobile electronic devices in a mobile information system may have different hardware and/or software configurations and capabilities, the mobile information system may be configured to adapt channel content based on the capabilities of the subscriber's device. For example, a wireless service provider administering the mobile information system (e.g., T-Mobile®, Verizon Wireless®, or Sprint Nextel®), may offer a sports channel to its subscribers. Content received from a sports channel content provider may comprise, for example, an image in Tagged Image File (.tif) format, a video clip in Moving Picture Experts Group 2 (MPEG-2) format, an audio clip in Windows Media Audio (WMA) format, and text in English. Subscribing devices, however, may not support some or all of the formats in which content is available. For example, some devices may support only certain types of audio, video, image, text or other formats. The supported formats may depend on the types of decoders available on the device, the types of protocols or data formats recognized by the device, data libraries available on the device, and hardware and/or software capabilities of the device. The number of possible combinations of relevant capabilities may be virtually limitless. For the wireless service provider to keep track of the capabilities of every subscriber device and determine which content items should be delivered to each subscriber device based on those capabilities may require extensive processing and memory resources. Instead of tracking individual capabilities, the service provider may define multiple device profiles that categorize mobile devices based on some minimum or nominal set of capabilities. In other words, a single device profile and an associated device profile identifier may be used for multiple different devices that have overlapping or similar (or in some cases, the same) capabilities with respect to the ability to handle or present different types of content.

Thus, when a subscriber device requests a content update for the sports channel, the device will inform the server of its assigned device profile identifier. Based on the device profile identifier, the service provider (or another entity or server that controls selection of content for delivery to mobile devices) may select an appropriate set of content or resources for delivery to the mobile device. For example, the content for the sports channel may include video, which may be available in multiple different formats. The video format delivered to the mobile device may be selected based on the device profile identifier.

In some implementations, the service provider (or another entity or server that controls selection of content for delivery to mobile devices) may also define multiple resource profiles that are used to describe the types of resources that may be used to serve content to the various mobile devices. In some implementations, different resource profiles may describe different sets of device capabilities that resources should comply with or support. For example, a resource profile may define a subset of the capabilities of what a device profile typically includes. The resource profile may then be used to select resources (e.g., content formats or root content) for use with specific device profiles. For example, root content may be in the form of a SWF file, and SWF files that comply with Flash 4 may correspond to one resource profile while SWF files that comply with Flash 6 may correspond to a different resource profile. In some cases, resource profiles may be defined for only some of the resources or formats supported by a mobile device and/or may represent a subset of all possible combinations of capabilities.

It may also be possible to define preferences for device profiles or resource profiles. A device profile may be able to support multiple alternative formats. Preferences may specify which of multiple available formats are preferred for a particular mobile device. For example, a mobile device may prefer images in JPEG (Joint Photographic Experts Group) format rather than other formats supported by the mobile device. In addition, preferences may also specify additional information for use in selecting the scope of the content update that is sent to the mobile device. For example, in connection with a channel that provides weather information, the preferences may identify three zip codes associated with the mobile device that help identify specific weather content updates that should be sent to the mobile device. Preferences may be communicated along with the device profile identifier that is included with a content update request from a mobile device.

When new content becomes available, the content may initially be provided in one or more initial formats. The content may be converted into one or more content variants, each of which may be different from the one or more initial formats. The conversion may involve converting the initial format (e.g., an image in JPEG format) into one or more content variants (e.g., a JPEG formatted image with a different resolution, a JPEG formatted image wrapped in a SWF file, etc.). In some implementations, the content variants may be generated according to resource profiles defined by the wireless service provider. The initial formats along with the various content variants may then be used to serve content updates to various subscribing mobile devices. The specific content updates delivered to a mobile device may be selected based on a combination of one or more of the device profile, the resource profile, and preferences.

FIG. 1 illustrates an example system 100 for providing content to mobile devices according to device capabilities. System 100 represents a mobile information system for delivering mobile data services to mobile device 110. The mobile information system represented in system 100 is administered by a wireless service provider, such as T-Mobile®, Verizon Wireless®, or Sprint Nextel®, that operates wireless network 106. Subscribers to the wireless service may receive external content from content providers 118 through mobile device 110. In some implementations, mobile device 110 is a mobile phone. In other implementations, mobile device 110 is a personal data assistant, a laptop computer, or any other device suitable to receive content over wireless network 106. Mobile device 110 may be configured to store local data 112, which may include a device profile identifier 130, preferences 132, and various other types of local data (e.g., local settings, contacts, call logs, calendar appointments and reminders, task lists, and the like). Individual implementations may include none, some, or all of these examples, in addition to other types of local data not shown.

At a high level, server system 104 may retrieve information from content providers 118, organize the retrieved information into individual information channel feeds, and deliver the information channel feeds to client 102. Client 102 may then store the information channel feeds in feed store 114. In addition to the dynamic channel feeds received from server system 104, feed store 114 may also contain one or more static feeds (not shown). Static feed content and associated permissions may be preloaded on mobile device 110 instead of delivered by server system 104. In addition to providing information, channel feeds may also be used to provide services, such as a home page user interface, calendar user interface and services, or other user interfaces or specialized application services.

When a subscriber attempts to access a particular information channel, for example, channel B, client 102 may retrieve channel B content 154 from feed store 114. Depending on the format of channel B content 154, client 102 may provide channel B content 154 to runtime component 116. In some implementations, channel B content 154 is a SWF file and runtime component 116 is an Adobe® Flash®-based runtime component. Client 102 and runtime component 116 may form two parts of a single application 108 running on mobile device 110. The application 108 may include a virtual machine running on a device platform 128.

Client 102 provides a framework for displaying and managing content received on mobile device 110, including content received from server system 104. Client 102 may be responsible for the caching and rendering of received content, for communication with server system 104, and for various other tasks. Client 102 may manage subscriber input and memory devices 112 and 114. In addition, client 102 may manage security features that protect the privacy of subscribers and content and prevent unauthorized parties from interfering with the service. In some implementations, client 102 is distributed preinstalled on mobile device 110, while in other implementations, client 102 or an update to client 102 is downloaded to mobile device 110, for example over wireless network 106.

Client 102 may access runtime component 116 to render a user interface and content. In some implementations, runtime component 116 is a media player that supports vector graphics, bitmaps, and frame-based animation, as well as text input and dynamic text. Runtime component 116 may be able to process files, such as SWF files, in which content providers 118 use native device fonts or embed arbitrary fonts. Runtime component 116 may also support scripting integration with mobile device 110 capabilities, including keypad navigation, button presses, notification, messaging, and media playback, as well as integration with general mobile device 110 operating system functionality. This enables client 102 to be integrated with other mobile device 110 applications and functionalities. Scripting may be accomplished with ActionScript™ or any other suitable scripting language supported by runtime component 116.

Client 102 may be configured to interact with mobile device 110's underlying features and applications through a set of scriptable commands. Such commands may enable channel content to retrieve and set subscriber preferences, provide time and date information from the host environment, or launch external applications such as a browser or media player. In some implementations, upon launching an external application, the subscriber is instantly transferred to that application. Client 102 may maintain the state of the user interface so that the subscriber can return to the same screen of client 102 from which the external application was launched, creating a perception of an integrated experience.

Client 102 may have a fully customizable user interface design that consists of individual Flash® elements (i.e., SWF files) independent of client 102's core functionality. In some implementations, the SWF files enable subscribers to use mobile device 110's soft keys to control navigation and client 102's meta functions such as setting preferences. Client 102 may be updated over wireless network 106 and may use an asynchronous communication protocol that updates all content through a background delivery mechanism that is transparent to subscribers. This enables subscribers to continue browsing one information channel, for example, channel B, while a different information channel is updated in the background. Subscribers can also change their preferences when offline; the transaction-based client-server protocol may ensure that such requests will be fulfilled the next time client 102 connects to server system 104. Communications between client 102 and server system 104 may be facilitated through libraries native to platform 128. Platform 128 represents the device-dependent operating system running on mobile device 110. Example implementations of platform 128 are BREW® OS, Symbian OS™, BlackBerry® OS, Windows Mobile® OS, Palm OS®, Linux, Windows XP®, Mac OS®, and the like.

When running in background mode, client 102 may minimize battery usage while periodically receiving updates from server system 104. In some implementations, subscribers can choose between a number of battery-conserving update options, for example, always update, update only when battery strength is above a certain level, and never update. If supported by platform 128, different applications may be running simultaneously. In such cases, client 102 may minimize its use of memory resources when other applications are active. For example, client 102 may have a hibernate mode in which it consumes only a fraction of its normal operating memory. Client 102 may also be configured to limit the number of information channels to which a subscriber may subscribe. When this limit is reached, client 102 may require a subscriber to remove an information channel before a new information channel may be added. Client 102 may also support Short Message Service (SMS) signaling, allowing server system 104 to awaken client 102 and initiate an immediate content update in the case of important events such as breaking news or an immediate retraction of inappropriate content.

Server system 104 may include clusters of feed servers 122 and data source servers 120, as well as report server 126. Report server 126 may allow service providers to monitor server activities and network traffic and may be integrated with other enterprise reporting solutions. The client-server architecture of system 100 may use clustering technology to help ensure performance, reliability, and scalability while minimizing deployment complexities through a flexible integration framework. Server system 104 may aggregate content from external content providers 118 received over the Internet 170 and organize the content into channel content feeds. Server system 104 may filter content feeds based on user preferences, mobile device 110 types, and access controls. Server system 104 may deliver the content feeds to client 102 over wireless network 106. Data source servers 120 may retrieve, normalize, and aggregate content from the web servers of content providers 118, may transform various formats of retrieved content, for example, into a common XML format, and may pass the content on to feed servers 122 for delivery to client 102. Retrievals may be scheduled at predetermined intervals, at which times only differential updates may be collected. Data source servers 120 may be configured to handle content feeds in various formats (e.g., RSS, Atom, XML, etc.). Content feeds may support embedded content types including, for example, text, images, and SWF files.

Server system 104 may define multiple device profiles 140 and multiple resource profiles 142 and may store content in multiple different formats in feed server 122. Data source servers 120 may receive data from a content provider 118 in a particular format and may convert the data into one or more content variants. The content variants may be generated using transformation filters from a library 144 of transformation filters. Each resource profile 142 may be associated with a predefined set of transformation filters that help ensure that content provided by content providers 118 is transformed into an appropriate format or content variant. In some implementations, the various available content variants may be stored in the feed servers 122 in association with a particular channel, such that when a content update is to be sent to a mobile device for the channel, the appropriate content variant or variants are selected from the channel store in the feed servers 122 for delivery to the mobile device 110. In other implementations, different content variants may be associated with different channels in the feed servers 122, such that mobile devices 110 subscribe to channels appropriate for the particular content channel. The selection of content variants to be delivered to client devices 110 may depend on a device profile identifier associated with the device 110. The device profile identifier may be initially assigned to the device 110 by the server system 104 based on the device's capabilities. Subsequently, the mobile device 110 may provide the device profile identifier to the server system 104 so that the server system 104 can determine, for example, which content variants are appropriate for the device.

Using system 100, service providers may be able to provide targeted data service offerings to subscribers. Service providers may be able to promote specific content bundles to certain segments such as business people, teens, casual users, and others. Service providers may be able to make specific content bundles available to all subscribers in, for example, a channel guide, allowing subscribers to select specific content bundles. To increase network efficiency, server system 104 may operate in an occasionally connected data model and may use a communication protocol that enables differential updates, minimizing unnecessary exchanges of data between server system 104 and client 102. For example, in the case of a weather channel, only an update to the temperature may be required, while all other content, such as images, video, or forecasts, remains the same.

Server system 104 may be equipped with an administrator process 124 providing the functionality required to manage the servers, including channel administration, subscriber administration, and system management. Using administrator process 124, service providers can check, for example, the amount of network traffic each channel generates, deactivate poorly performing channels, and dynamically provision, modify, or remove channels, among other tasks. The administrator process 124 may also facilitate management of device profiles and resource profiles.

Typically, content updates are initiated by the client 102 periodically, when communications resources are available, or when the device is otherwise sufficiently idle to receive updates. The client 102 may send a request for an update that includes an identifier of the client 102 or mobile device 110, an identifier of a device profile previously assigned by the server system 104 based on capabilities of the mobile device 110, an identification of channels to which the mobile device 110 subscribes, and a timestamp of a last content update. The frequency of update requests may be dictated by instructions received from the server system 104. In some implementations, however, content updates may be initiated by the server system 104. When client 102 receives a content update from server system 104 via the channel feed, client 102 stores the channel content in feed store 114. For example, when client 102 receives a content update for Channel B, client 102 updates Channel B feed 154 in feed store 114. Channel B feed 154 may be updated multiple times before a subscriber ever accesses it. When a subscriber accesses Channel B through the mobile device 110 user interface, client 102 may retrieve Channel B content 154 (e.g., a SWF file) and provide the content to runtime component 116 (e.g., a media player).

Figure 2:
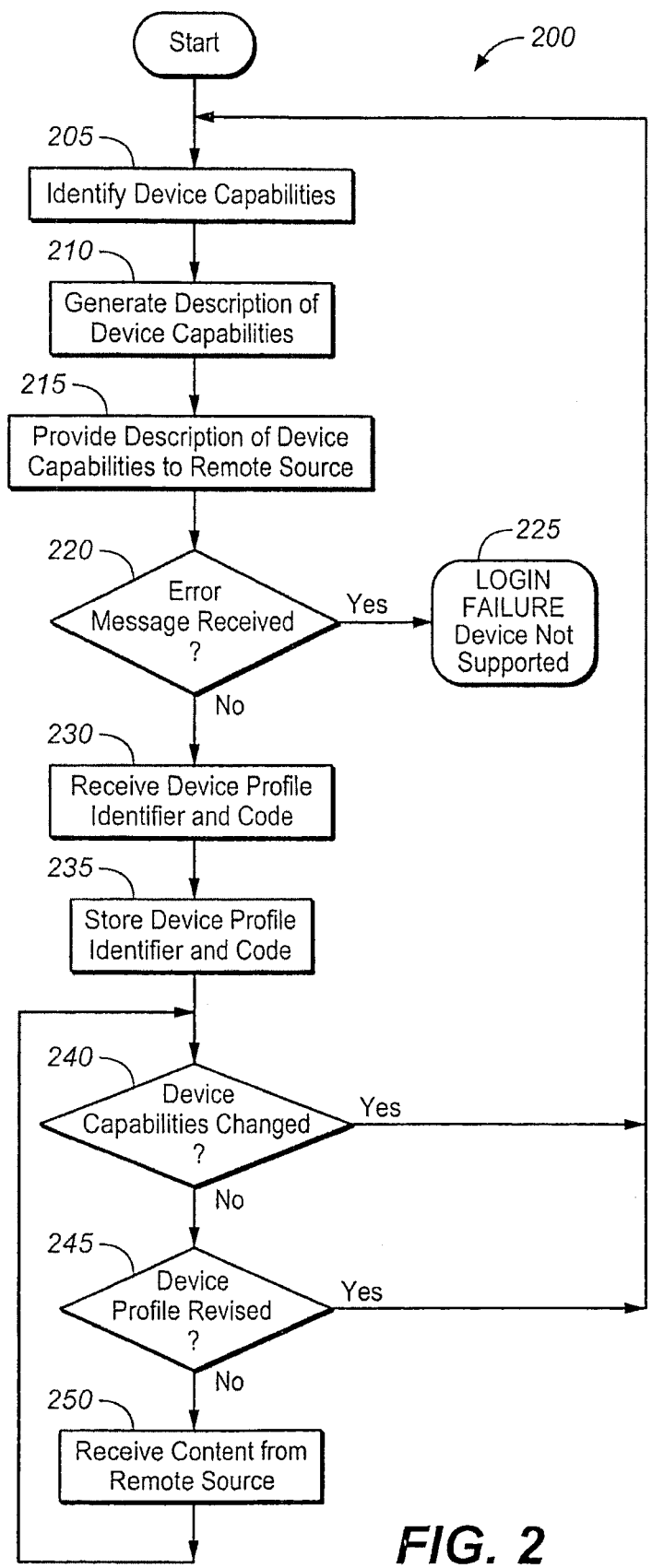
FIG. 2 is a flow diagram of a process for assigning a device profile based on device capabilities.

FIG. 2 is a flow diagram of a process 200 for assigning a device profile based on device capabilities. A set of device capabilities for a mobile device are identified at 205. One or more of device capabilities may be identified or collected by the device itself, for example, by reading settings, examining a configuration file associated with the mobile device, identifying installed software and data, and identifying available hardware on the device. Some of the device capabilities may also be identified by a server or other component remote from the mobile device. For example, when the server receives an indication of the type or model of the mobile device, the server may have access to data indicating certain device capabilities associated with the mobile device (e.g., maximum size of file downloads) that are not stored on or otherwise known to the device itself. The identified device capabilities may include, for example, one or more languages supported by the electronic device; applications and/or application versions installed on the electronic device; an operating system installed on the electronic device; hardware devices installed on, included in, or otherwise accessible to the electronic device; one or more video formats supported by the electronic device; one or more audio formats supported by the electronic device; one or more image formats supported by the electronic device; and/or communications protocols supported by the electronic device.

A description of the set of device capabilities is generated at 210. The description may be in the form of codes, descriptive text, or any other desired format. The description may include multiple elements, some of which may define single device capability (e.g., screen size) while others may define multiple related device capabilities (e.g., available audio and video decoders). The description of device capabilities are then provided to a source (e.g., server system 104 of FIG. 1) remote from the mobile device at 215. The description may be provided from the mobile device and from other components, including the server system 104 depending on where the capabilities were identified. Those portions of the description provided by the mobile device may be sent at an initial registration of a mobile device 110 with the server system 104, at a registration after power up or loss of connectivity, along with a request for content updates, or at any other time.

Based on the description, a device profile corresponding to the set of device capabilities may be identified. The device profile may define a set of capabilities that are a subset of, that overlap with, or that otherwise are similar to the identified set of device capabilities for the mobile device. In some cases, certain device capabilities may not be recognized or otherwise may not be supported, for example, by the server system 104, in which case an error message may be received at 220. The error message may indicate, for example, a login failure for a mobile device 110 with the server system 104 because the device is not supported by the system 104 (as indicated at 225). Otherwise, a device profile identifier for the assigned device profile may be received by the mobile device at 230 and stored on the mobile device at 235. A code, such as a timestamp or other information that can be used to authenticate or validate the device profile identifier or to determine when the device profile identifier was last updated, may be received and stored along with the device profile identifier.

Subsequently, the mobile device may be monitored for changes in configuration or device capabilities at 240. For example, mobile device 110 may detect when new or upgraded software is installed on the mobile device, when hardware capabilities change, and/or when settings on the device are modified. Server system 104 may also monitor for changes to the device based on system side upgrades or modifications. If a change to the device capabilities is detected, the process 200 may return to 205 so that a determination can be made as to whether a new device profile should be assigned to the device and potentially to obtain a new device profile identifier and associated code.

If no change in device capabilities is detected, a determination as to whether revisions to a device profile identifier have been made at 245. A device profile identifier may be revised as a result of changes in categorizations for device profiles on a server system 104. For example, if certain device capabilities begin to become outdated or obsolete, such that only a few devices remain on two or more similar device profiles that correspond to the obsolete capabilities, server system 104 may combine the two or more device profiles to generate a new device profile and free up resources for creation of other new device profiles corresponding to other device capabilities. A change in device profile identifiers may be determined by server system 104 on its own or as a result of receiving a message from the mobile device that includes the current device profile identifier and/or the code associated with the current device profile identifier on the mobile device. Based on the code, for example, the server system 104 may determine that the current device profile identifier is out of date. Server system 104 may also determine that the current device profile identifier is no longer used. If a device profile identifier is revised, the process 200 may return to 205 so that a determination can be made as to whether a different device profile identifier should be assigned to the device. Otherwise, the mobile device may periodically request and/or receive content updates from a remote source in accordance with the assigned device profile at 235. Typically, mobile device 110 periodically sends requests for content updates accompanied by the device profile identifier for the mobile device 110, which allows server system 104 to determine which content formats or other resources to send to mobile device 110.

Figure 3:
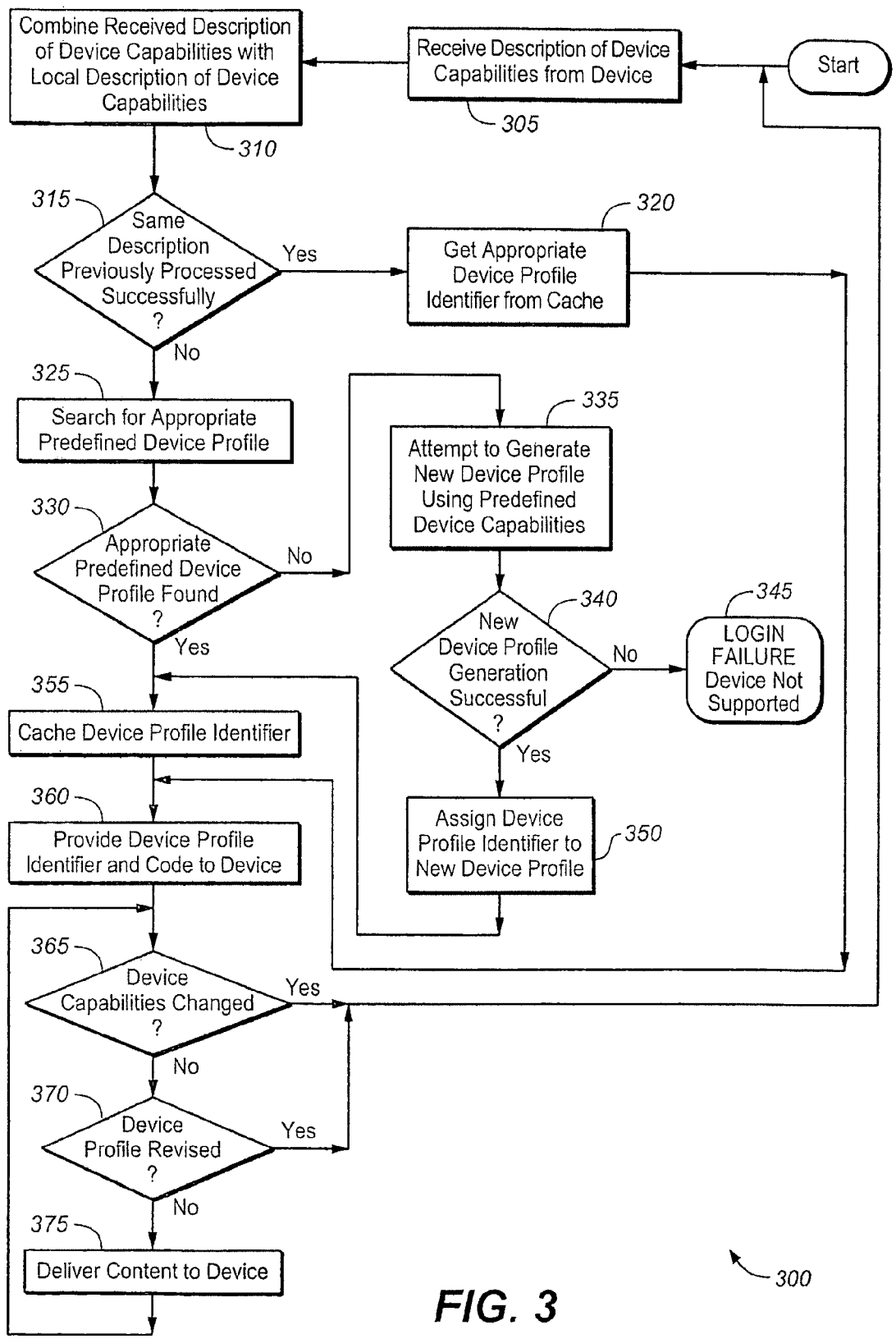
FIG. 3 is a flow diagram of a process for managing device profile assignments.

FIG. 3 is a flow diagram of a process 300 for managing device profile assignments. The process 300 may typically be performed remote from the mobile device, such as at server system 104 (see FIG. 1). Process 300 may be performed in connection with process 200 of FIG. 2. A description of device capabilities are received from a mobile device at 305. The received description may correspond to the description generated at 210 (see FIG. 2). The received description is combined with any local description of device capabilities (e.g., generally known capabilities or limitations associated with the type of mobile device) at 310. If a determination is made at 315 that the combined description of device capabilities is the same description as has been previously processed successfully, an appropriate current device profile identifier is retrieved at 320 and the device profile identifier is delivered to the device as described below. For example, the device profile identifier may be stored in a database or cache at server system 104 in association with a device profile that defines one or more corresponding sets of device capabilities. Typically, the cache defines multiple device profiles, where each device profile corresponds to some different subset of capabilities recognized by the server.

If the combined description of device capabilities is not the same description as has been previously processed successfully, a search is conducted for an appropriate predefined device profile at 325. For example, the described set of device capabilities may not correspond exactly to a previously processed set of capabilities because it includes one or more additional or different capabilities with respect to previously processed sets of capabilities. Despite the difference, an existing device profile may be used in some cases for the device, although the existing device profile may not enable use of all of the device capabilities available on the mobile device or it may allow for the delivery of some content that is not necessarily fully compatible with the mobile device. In some cases, preferences may be assigned to the device in addition to the device profile, which may enable the server system 104 to select appropriate alternatives to avoid, for example, delivering content that is incompatible with or not supported by the mobile device 110. For example, a particular device profile may be associated with a set of device capabilities that includes a JPEG (.jpg) image format, a graphics interchange (.gif) format, and a tagged image file (.tif) format, while a particular device to which the device profile is assigned may not have device capabilities to support one of these formats. Preferences stored at server system 104 or on the mobile device itself and sent to the server system 104 along with requests for content updates may be used to avoid delivering the unsupported format to the mobile device.

If it is determined at 330 that an appropriate predefined device profile can not be identified, an attempt can be made to automatically created a new profile at 335. For example, if the relevant capabilities are known and supported by server system 104, but the set of capabilities do not currently correspond to an existing device profile, a device profile can be automatically generated for assignment to the mobile device. If it is determined at 340 that the attempt to generate a new device profile is unsuccessful, a login failure message indicating that the device is not supported can be generated at 345. The login failure message may be sent to the mobile device and/or to a system administrator for determination of whether changes need to be made to be able to support the device. If the attempt is successful, a device profile identifier is assigned to the new device profile at 350. In some cases, the server may recognize less than all of the described device capabilities. For example, when a description element lists all audio formats supported by the device, the server may recognize or support only some of the identified capabilities. A device profile may be assigned, however, based on those capabilities that are supported by the server.

Once a valid device profile and an associated device profile identifier are identified, the device profile identifier and the associated device capabilities may be stored in a cache or database at 355. The device profile identifier and an associated validity code or timestamp are delivered to the device at 360. Subsequently, the device can be monitored at 365 for changes in device capabilities. Such changes can be identified by server system 104 or by the mobile device, which can communicate the changes to server system 104. Alternatively, the mobile device may periodically send its set of device capabilities to server system 104 for a determination of whether device profile updates are necessary. If a device capability has changed, process 300 returns to 305 to determine whether a new device profile should be assigned.

The server can also be monitored to determine if a device profile has been revised at 370. In some implementations, it may be necessary or desirable to revise or update device profiles in connection with changing device capabilities, trends in numbers of devices using certain device capabilities, and the like. In some implementations, a validity code associated with the mobile device and sent by the mobile device to the server may be compared with a reference code stored at the server. The validity code may represent a timestamp of when the device profile identifier was last updated, and the reference code may represent a timestamp of when the corresponding device profile was last updated (or was discontinued as obsolete). By comparing the validity code with the reference code, the server can determine whether the device should be assigned a new device profile. A similar process can be performed to check whether a configuration file associated with the mobile device has been modified so that the server can determine whether a device profile update is necessary. Validity codes can be sent either from the mobile device to the server for comparison with a reference code at the server side or from the server to the mobile device for comparison with a reference code at the mobile device. If either the device capabilities have changed or the device profile has been or needs to be revised, the server can request that the mobile device send its current set of device capabilities for processing by the server. Once a device profile identifier has be assigned to a mobile device, server system 104 periodically delivers content updates to the mobile device for appropriate channel subscriptions at 375.

Figure 4:
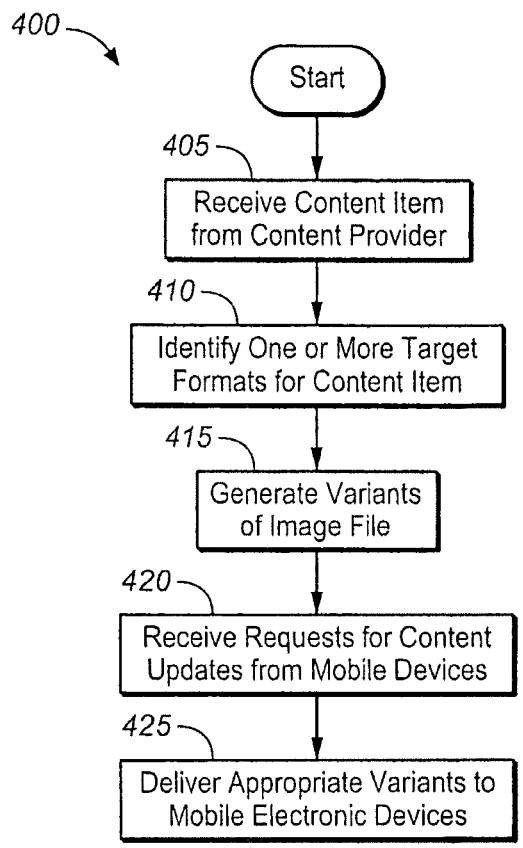
FIG. 4 is a flow diagram of a process for producing variants of content for delivery to mobile devices.

FIG. 4 is a flow diagram of a process 400 for producing variants of content for delivery to mobile devices. A content item is received from a content provider at 405. For example, content may be received at server system 104 from a content provider 118 (see FIG. 1). The content provider may provide the content in a particular format or configuration. For example, the format of the content may include an image having a particular resolution and having a specific image format. One or more target formats for the content item may be identified at 410. The target formats generally relate to formats or configurations that are necessary to serve content to one or more mobile devices that subscribe to a particular channel for which the content is provided. In some implementations, the target formats may correspond to resource profiles that define the types of resources to be maintained in the feed servers 122. For example, a content item may include a video clip having a particular video coding format. The target formats may include video clips having alternative video coding formats (e.g., for sending to mobile devices that do not support the particular video coding format used by the content provider), an image that represents one or more frames from the video clip, and video clips or images that are embedded or wrapped in a SWF file.

Variants of the image file may be generated at 415. For example, one variant may be generated for each of the identified target formats. Each variant may correspond to a resource profile. The variants may be generated before a request for a channel update that implicates the particular content is received and then stored or cached for transmission when channel update requests are received from mobile devices having a device profile and/or preferences that match the variant. Alternatively, the variants may be generated dynamically if a requested variant is not already available. Thus, if a request for a channel update is received, and the request is received from a mobile device having a device profile indicating that content should be sent in a particular format, but the content has not yet been transformed into that format, the data source servers 120 may transform the content "on the fly" so that it can immediately be sent to the requesting mobile device. Content items may be transformed based on any number of possible types of content variants, such as image formats, audio formats, video formats, text layouts, sizing restrictions, resolution restrictions, and the like.

In some implementations, it may be desirable to limit the number of variants that are created. For example, two different devices may have slightly different screen sizes and thus two different variants of an image could be created (e.g., by cropping an image slightly differently to match the different screen sizes). To avoid complexity and to reduce resource requirements, it is possible to create one image that can be displayed on either device. The number of alternative formats may be reduced, for example, through the use of the resource profiles, which may enforce rules that limit the number of variants that are produced. Thus, each possible device profile may be linked to a set of resource profiles. In some implementations, for example, it may be desirable to select resource profiles for linking to the device profiles according to whether there is a resource profile that will provide content that is compatible with the device profile, even if not optimal, rather than creating another resource profile and/or additional variants. Similarly, it is typically necessary to create variants only for capabilities for which there is a demand. For example, if there is a device that requires a particular image format, but the device does not subscribe to a channel on which a particular content item is provided, it is typically unnecessary to create a variant for the device.

Requests for content updates are received from mobile devices at 420. The content update requests may include device profile identifiers for the devices that sent the requests. The target formats identified at 410 may include target formats that are identified based on the device profile identifiers of mobile devices that have either requested a content update or that subscribe to a content channel associated with the content item. Appropriate variants are delivered to mobile electronic devices at 425. The variants generally are delivered in response to requests for content updates from the mobile devices. The server system 104 may determine which content variants should be provided for which device profiles.

Figure 5:
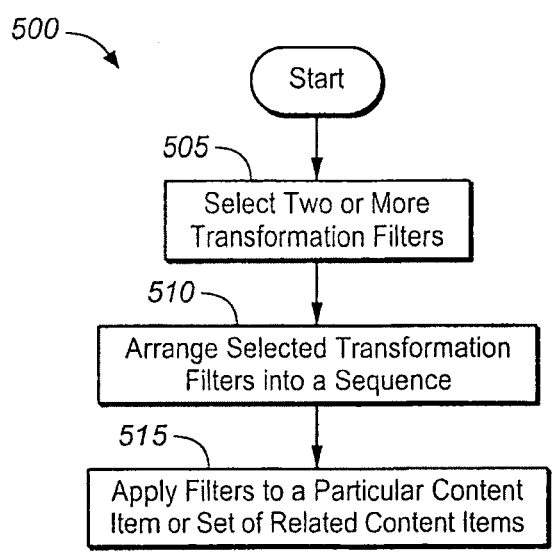
FIG. 5 is a flow diagram of a process for transforming content into an appropriate configuration using a sequence of transformation filters.

FIG. 5 is a flow diagram of a process 500 for transforming content into an appropriate configuration using a sequence of transformation filters. As described above, when content arrives at server system 104, the content may be transformed into one or more content variants. The transformations may be based on the defined device profiles and/or the defined resource profiles. The transformation may be performed using a chain of transformation filters. In some implementations, a transformation filter chain may correspond to one or more resource profiles. A transformation filter may receive content item in a particular format and/or having other pre-defined characteristics and may transform the content item into one or more content variants. In some implementations, each resource profile may have a single associated filter chain.

To perform a transformation of a content item into a content variant, two or more transformation filters may be selected from a library of transformation filters at 505. The transformation filters may each operate to accept input and produce output. For example, different filters may be provided for cropping an image, resizing the image, converting between color and black and white images, enhancing contrast, modifying colors, adding image layers, masking portions of an image, or rotating the image. Other filters may be provided for other types or characteristics (video, audio, text, and the like) of content. The individual transformation filters may be reused for different filter chains and may be combined with parameters that determine a degree to which a particular operation is performed (e.g., whether an image is rotated 90 degrees or 180 degrees).

The selected transformation filters may be arranged into a sequence of transformation filters at 510. The sequence may include at least a first transformation filter that receives content items as provided by the content provider and a last transformation filter that outputs the result of the filter chain (e.g., a content variant). Otherwise, each filter in the chain may accept as input the output of the preceding filter. In some implementations, each resource profile may define one or more filter chains by identifying which filters from the library should be used, in what sequence, and any parameters or other data to be applied to the filter chain. The sequence of transformation filters may be executed or applied to a particular content item or set of related content items at 515. The execution of the filter chain may thus produce one or more content variants.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a computer-readable medium for execution by, or to control the operation of, data processing apparatus. The computer-readable medium can be a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described is this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the invention have been described. Other embodiments are within the scope of the following claims. For example, the actions recited in the claims can be performed in a different order and still achieve desirable results. The described techniques may be implemented in non-mobile environments (e.g., using wire-line communications, such as a cable connection, with a non-mobile client, such as a set-top box).

What is claimed is:

1. A method comprising:
receiving, over a network, a device profile identifier at an electronic device, the device profile identifier assigned by a profile server and representing a set of device capabilities of the electronic device;
storing the received device profile identifier on the electronic device;
including the received device profile identifier in a communication from the electronic device to a feed server; and
receiving, from the feed server, content selected based, at least in part, on the received device profile identifier.

2. The method of claim 1, further comprising:
before receiving the device profile identifier, identifying the set of device capabilities at the electronic device; and
transmitting a description of the set of device capabilities from the electronic device to the profile server, wherein the device profile identifier is received from the profile server in response to transmitting the description.

3. The method of claim 1, the device profile identifier comprising a first device profile identifier, the set of device capabilities comprising a first set of device capabilities, the communication comprising a first communication, the method further comprising:
after storing the first device profile identifier, receiving a second device profile identifier at the electronic device, the second device profile identifier representing a second set of device capabilities that is different from the first set of device capabilities;
storing the second device profile identifier on the electronic device; and
including the second device profile identifier in a second communication from the electronic device to the feed server.

4. The method of claim 1, wherein the device profile identifier is selected by the profile server, and the electronic device receives the device profile identifier from the profile server.

5. The method of claim 4, wherein the device profile identifier is selected by the profile server based at least in part on software characteristics of the electronic device.

6. The method of claim 4, wherein the device profile identifier is selected by the profile server based at least in part on hardware characteristics of the electronic device.

7. The method of claim 4, wherein the device profile identifier is selected by the profile server based at least in part on content stored on the electronic device.

8. The method of claim 1, wherein the device capabilities include at least one of a language supported by the electronic device, an application installed on the electronic device, an operating system installed on the electronic device, a hardware device installed on the electronic device, a video format supported by the electronic device, an audio format supported by the electronic device, an image format supported by the electronic device, or a communications protocol supported by the electronic device.

9. A computer program product, encoded on a computer-readable storage medium, operable when executed on an electronic device to cause a data processing apparatus to perform operations comprising:
storing, on the electronic device, a device profile identifier received over a network, the device profile identifier assigned by a profile server and representing a set of device capabilities of the electronic device;
including the received device profile identifier in a communication from the electronic device to a feed server; and
receiving, from the feed server, content selected based, at least in part, on the received device profile identifier.

10. The computer program product of claim 9, wherein the operations further comprise:
before receiving the device profile identifier, identifying the set of device capabilities at the electronic device; and
transmitting a description of the set of device capabilities from the electronic device to the profile server, wherein the device profile identifier is received from the profile server in response to transmitting the description.

11. The computer program product of claim 9, wherein the device profile identifier is selected by the profile server, and the electronic device receives the device profile identifier from the profile server.

12. The computer program product of claim 11, wherein the device profile identifier is selected by the profile server based at least in part on at least one of:
software characteristics of the electronic device;
hardware characteristics of the electronic device; or
content stored on the electronic device.

13. A system comprising:
one or more servers operable to perform operations comprising:
identifying a first device profile identifier assigned to an electronic device, the first device profile identifier corresponding to a first set of device capabilities;
selecting a second, different device profile identifier for assignment to the electronic device as a replacement for the first device profile identifier, the second device profile identifier corresponding to a second set of device capabilities;
sending the second device profile identifier over a network to the electronic device; and
selecting content for transmission to the electronic device based, at least in part, on receiving the second device profile identifier in a communication from the electronic device.

14. The system of claim 13, wherein the second device profile identifier is selected based on information received from the electronic device.

15. The system of claim 13, wherein the second device profile identifier is selected based on updated software characteristics of the electronic device.

16. The system of claim 13, wherein the second device profile identifier is selected based on updated hardware characteristics of the electronic device.

17. The system of claim 13, wherein the second device profile identifier is selected based on updated content on the electronic device.

18. The system of claim 13, wherein the second device profile identifier is selected based on a determination that the first device profile identifier represents an obsolete device profile.

19. The system of claim 13, the operations further comprising:
identifying a plurality of device profiles, the first device profile identifier representing one of the identified plurality of device profiles;
generating a new device profile based on combining the identified plurality of device profiles; and
generating the second device profile identifier to represent the new device profile.

20. The system of claim 19, wherein identifying the plurality of device profiles includes identifying a plurality of obsolete device profiles.

* * * * *